Figure 1:
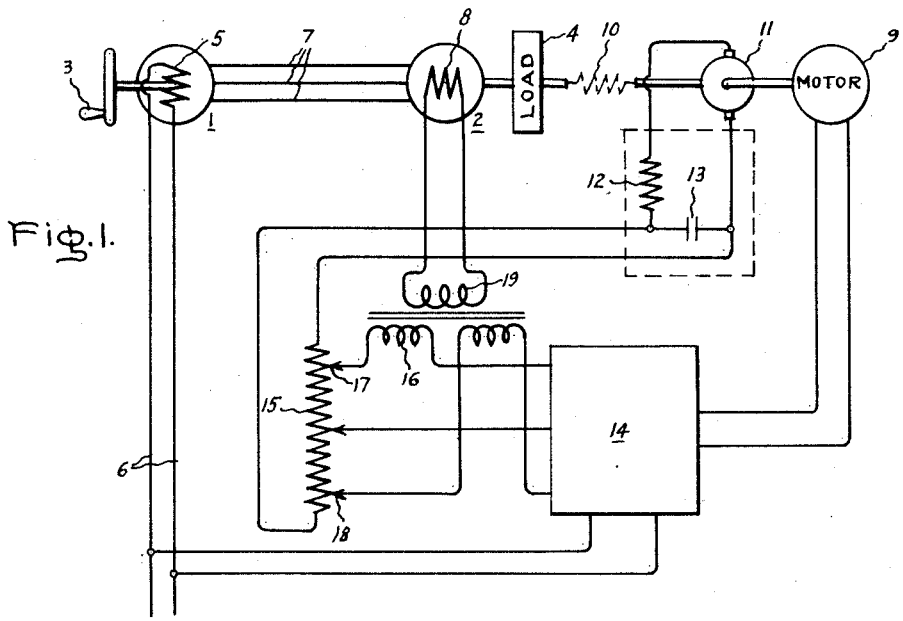

Oct. 21, 1952   J. H. LIVERSIDGE   2,615,150
POSITIONAL CORRESPONDENCE CONTROL SYSTEM
Filed Oct. 12, 1950

Inventor:
Joseph H. Liversidge,
by Marcell F. Mack
His Attorney.

Patented Oct. 21, 1952

2,615,150

UNITED STATES PATENT OFFICE 2,615,150

POSITIONAL CORRESPONDENCE CONTROL SYSTEM

Joseph H. Liversidge, Sheffield, England, assignor to General Electric Company, a corporation of New York Application October 12, 1950, Serial No. 189,751
In Great Britain February 7, 1949

10 Claims. (Cl. 318—30)

This invention relates to control systems of the positional correspondence kind, that is, control systems for maintaining a movable member in a required position corresponding with that of a fixed or movable control member or object, such as in alignment with a control member.

The present invention comprises improvement in control systems such as disclosed in the copending application of F. H. Belsey et al., Serial No. 65,708, filed 16 December 1948, now Patent No. 2,582,221 and titled "Control Systems of the Correspondence Kind for Movable Members."

According to said application, in control systems of the kind above referred to, means are provided responsive to relative movement between a motor and a movable member for producing a resultant control action dependent partly on movement of the movable member with respect to the required position thereof and partly on movement of the motor with respect to the position thereof corresponding with the required position of the movable member, whereby to give less stiffness of control for movement of the motor away from the position corresponding with the required position of the movable member independently of corresponding movement of the movable member, as a result of backlash or resilience in the drive between said motor and said member, than for movement of the motor and movable member in correspondence with one another away from the required position of the movable member.

In the arrangements described in said application, the control action derived from the displacement of the motor may introduce a steady state error in the alignment of the movable member with respect to the required position thereof. For example, assuming the motor to be positioned in the center of the relative movement possible between said motor and movable member, such as due to resilience or backlash, then movement of the motor to one side or the other of said movement would introduce an error into the alignment of the movable member with respect to the required position thereof. The magnitude of this error is dependent on the magnitude of the possible relative movement between the motor and the movable member, and the relative magnitudes of the control actions derived from the motor and the movable member. The alignment error is always less than said relative movement and is equal to $$\frac{bR_m}{R_m+R}$$

where $b$ is half the movement of the movable member possible with respect to the motor, and $R_m$ and $R$ are respectively the magnitudes of the control actions derived for unit movement of the motor and the movable member. The error may be comparable in magnitude to the normal errors of the control system.

The present invention relates to the provision, in a control system such as referred to in the aforesaid application of means responsive to the velocity of the motor for producing a control quantity in accordance with an approximate form of integration of said velocity, whereby the control action dependent on the displacement of the motor is of a transient nature only, that is to say is zero under steady state position conditions independently of the position of the motor with respect to the movable member over the range of relative movement between the motor and the movable member.

The arrangements according to the invention may thus comprise, in combination with means responsive to the displacement of the main load or movable member adapted to condition the motor for moving the movable member into the required position, means responsive to the velocity of the motor and means for integrating an output quantity from said velocity responsive means for producing a further control action tending to align the motor with the position thereof corresponding with the required position of the movable member.

In carrying out the present invention, response to the first time derivative may be introduced by differentiation of the control quantity derived in accordance with the displacement of the movable member and the integration of the velocity of the motor.

In carrying out the invention the means responsive to the velocity of the motor and the integrating means are conveniently of an electrical nature although it will be understood that the invention is not limited in this respect.

According to a further feature of the invention, means are provided for producing a control action dependent on the velocity of the movable member and acting in opposition to the control action produced in dependence on the velocity of the motor when the movable member and motor are moving in corresponding directions to one another, the input to the integrating means being derived in accordance with the algebraic sum of the control action produced by said two velocity responsive means.

According to a still further feature of the invention, the control action dependent on the velocity of the movable member is made less than the control action dependent on the velocity of the motor, for corresponding velocities of said member and motor, whereby to provide the effect of a derivative output reset and so introduce a stabilizing effect into the system. Alternatively the first control action is made greater than the second control action whereby any desired degree of correction of velocity errors otherwise present in the system may be obtained.

Figure 2:
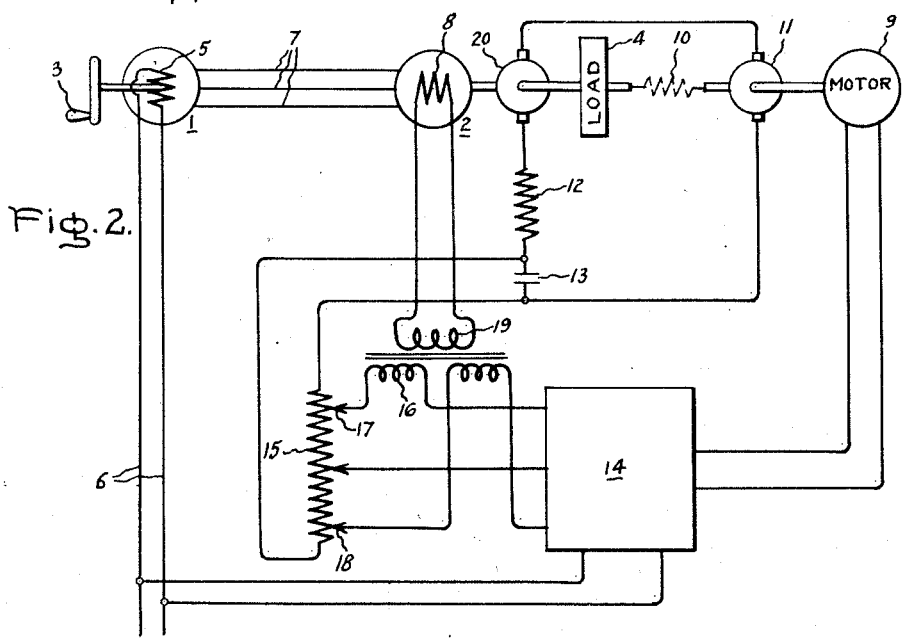
Figure 3:
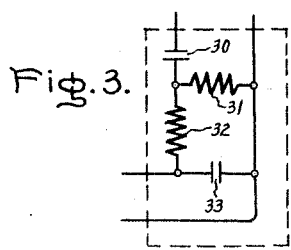

Reference will now be made by way of example to the accompanying drawings, in which:

Figs. 1 and 2 are electrical circuit diagrams illustrating respectively two embodiments of the invention, similar reference numerals being used for indicating like parts in both figures, and Fig. 3 is a fragmentary circuit diagram showing a modification of that part of the system of Fig. 1 which is enclosed in dotted lines.

In the embodiment of the invention shown in Fig. 1, the control system comprises a pair of selsyns 1 and 2 coupled respectively with a control member or controller comprising a handwheel 3, with which the movable member, shown diagrammatically at 4, is required to be maintained in positional correspondence, and with said movable member 4. The selsyn 1 includes a single phase rotor having a winding 5 connected by means of conductors 6 with a source of alternating current preferably of comparatively high frequency such as of the order of 1,000 cycles per second. The two selsyns are provided with stator winding of polyphase type interconnected by means of conductors 7 in well-known manner so as to cause the production in a single phase rotor winding 8 of the selsyn 2 of an alternating voltage dependent over a given range as to magnitude on the relative displacements of the two selsyns and dependent as to sense or the direction of misalignment between the two selsyns.

The member 4 is driven by an electric motor or other motive equipment 9 through a mechanical transmission backlash or resilience in which is represented diagrammatically at 10.

A D.-C. tachometer generator 11 is coupled with the motor so as to move therewith without appreciable backlash and has its terminals connected with an integrating circuit which may, for example, comprise a simple series connected resistor 12 and capacitance 13. The tachometer generator produces a voltage proportional to the velocity of the motor 9 so that there will appear across the capacitance 13 a unidirectional voltage indicative of the displacement of the motor. This voltage is combined with the A.-C. signal derived from the selsyn winding 8 and applied to the input circuit of an amplifier 14, the output circuit of which controls the motor. The amplifier may be a thermionic phase discriminating type illustrated in British Patent 611,046, particularly at Fig. 1 thereof, and in British Patent 610,029.

In the arrangement shown, the input circuit to the amplifier includes a center-tapped resistor 15 connected across the capacitance 13 with the inputs of the phase discriminating amplifier 14 connected through transformer secondary windings 16 and 16a respectively with variable tapping points 17 and 18 of the resistor 15. The windings 16 and 16a are associated with a primary winding 19 which is connected in series with the selsyn winding 8.

In the operation of this arrangement the amplifier 14 controls the motor 9 in accordance with the resultant input to said amplifier, which input comprises the alternating current signal derived from the selsyns 1 and 2 and the direct current signal derived from the tachometer generator 11 and integrating circuit 12, 13. The response is thus partly dependent on the displacement of the movable member 4 with respect to the control member 3 and partly on the displacement of the motor 9 with respect to the control member but the latter response is effective only during transient conditions, that is during change in position of the motor.

The proportion of the response obtained from the tachometer generator in relation to that derived from the selsyns may be adjusted by means of the tappings 17 and 18.

The time constant of the integrating network which comprises the resistance 12 and capacitance 13, is made sufficiently large so as to insure that, at the frequencies at which the equipment would otherwise tend to oscillate, the network provides a reasonably pure integration. It will be understood that ideal integration would not produce zero steady state error, and is therefore not required in carrying out the invention.

At frequencies lower than those at which the equipment would tend to oscillate, the output voltage of the integrating circuit approximates to a derivative output feedback, being suppressive feedback proportional to the velocity of the tachometer generator. Feedback of this nature has a stabilizing effect on the system and will also generally have a desirable effect on the response of the system to low frequency components in the movement of the control member and motor. It will of course be understood that other well known forms of integrating circuits may be employed if desired.

In Fig. 2 a second tachometer generator 20 is coupled with the movable member 4 so as to move therewith without appreciable backlash, and this tachometer generator is connected in series with the tachometer generator 11 in the input connections of the integrating circuit 12, 13 in such direction as to oppose the generator 11 when the motor and movable member are moving together. The generators 20 and 11 produce equal voltages for corresponding speeds of the movable member and motor so that when the motor is moving in correspondence with the movable member, no resultant signal is applied to the integrating circuit, but when the motive equipment moves relatively to the movable member as permitted by the backlash or resilience in the drive from the motor to the movable member, the two tachometer generators do not move in correspondence and therefore produce a resultant voltage which is applied to the integrating circuit. By this means the control action dependent on the velocity of the motor is effective only when the motor is moving with respect to the movable member and no steady state velocity errors result.

Instead of the tachometer generators 11 and 20 being arranged to produce equal voltages for velocities of the motor and movable member in correspondence with one another, that is to say not subject to the effect of backlash or resilience 10, the voltage of generator 20 may be made less than that of generator 11 for such corresponding velocities, in which case the effect of a derivative output reset is produced with the introduction of a stabilizing effect into the system. On the other hand, the voltage of the generator 20 may be made greater than that of the generator 11 for corresponding velocities of the movable member and motor and by this means any desired degree of correction of velocity errors otherwise present in the system may be obtained.

In an alternative method for overcoming steady state velocity errors, the integrating network is arranged so as to become effectively a differentiating circuit at very low frequencies, such as for instance, three or four octaves lower than the frequency of servo resonance. In one arrangement as shown in Fig. 3, the integrating circuit comprises on the input side a capacitance 30 and resistor 31 in series with one another and on the output side a resistor 32 and capacitance 33 in series connected across the resistor 31, with the output of the circuit (resistor 15) taken from the voltage appearing across the capacitance 33. The product of the resistance 32 and capacitance 33 is selected as hereinbefore described, with reference to resistor 12 and capacitance 13 of Fig. 1, to produce reasonably pure integration at the frequency at which the equipment would otherwise tend to oscillate, while the product of the resistance 31 and capacitance 30 is made much larger than said first product. The mutual effects between the input and output sides of the circuit are preferably minimized by any of the well-known methods. For instance, the impedance level of said input side may be made much lower than the impedance level of said output side, or the input and output sides may be separated by a non-return circuit arrangement such as a thermionic valve as is well-known in the art. This arrangement eliminates steady state velocity errors but the correction will not in general be so accurate as that obtained from circuits such as that shown in Fig. 2 in which means responsive to the velocity of both the motor and movable member act in opposition to one another.

While particular embodiments of my invention has been illustrated and described, modifications thereof will readily occur to those skilled in the art. It should be understood therefore that the invention is not limited to the particular arrangement disclosed but that the appended claims are intended to cover all modifications which do not depart from the true spirit and scope of the invention.

I claim:

1. In a positional correspondence control system having, a load member, a motor, and driving means between said motor and said member, the combination therewith comprising, means responsive to the velocity of said motor, integrating means connected to the output of said velocity responsive means, means responsive to the displacement of said load member, a controller, and means connected to said motor for combining the outputs of said integrating means, said displacement means and said controller whereby to govern the operation of the motor.

2. In a positional correspondence control system having, a load member, a motor, and driving means between said motor and said member, the combination therewith comprising, a controller, alignment means connected between said controller and said motor for governing the operation thereof in accordance with the position of said controller, said alignment means including, electrical means connected to said motor for producing an output dependent on the velocity of said motor, and an electrical circuit connected to the output of said electrical means for producing an output corresponding to the time integration of the output of said electrical means.

3. In a positional correspondence control system having, a load member, a motor, and driving means between said motor and said member, the combination therewith comprising, velocity responsive means coupled to said member, velocity responsive means coupled to said motor, an integrating circuit connected to said motor velocity responsive means, a control member, means for governing the operation of said motor, and means connected to said governing means for serially combining the outputs of said member velocity responsive means, said integrating circuit and said control member whereby to energize said governing means.

4. In a positional correspondence control system having, a load member, a motor, and driving means between said motor and said member, the combination therewith comprising, a first tachometer generator coupled to said member, a second tachometer generator coupled to said motor, an integrating circuit connected to said second tachometer generator, a controlling member, and means for applying the outputs of said first generator, said integrating circuit and said control member to produce a control quantity for governing the operation of said motor.

5. In a positional correspondence control system having, a load member, a motor and driving means between said motor and said member, the combination therewith comprising, a generator coupled to said motor, an integrating circuit connected to said generator, a control selsyn, a load selsyn connected between said load and said control selsyn and adapted to produce a control quantity dependent upon the relative displacement of said selsyns, and means connected to said motor for combining the outputs of said control selsyn, said load selsyn and said integrating circuit for governing the movement of said motor in accordance with the position of said control selsyn.

6. The apparatus defined in claim 5 wherein, said generator is of the unidirectional voltage type and said selsyns are designed to operate at frequencies in the order of 1,000 cycles.

7. In a positional correspondence control system having, a load member, a motor, and driving means between said motor and said member, the combination therewith comprising, displacement responsive means coupled to said member, velocity responsive means coupled to said motor, an integrating circuit connected to said motor velocity responsive means, a control member, an amplifier connected to said motor, and means connected to the input of said amplifier for serially combining the outputs of said displacement responsive means, said member velocity responsive means, said integrating circuit and said control member whereby to produce a control quantity which is partly dependent on the displacement of said load member with respect to said control member, and partly on the displacement of said motor with respect to said control member.

8. In a positional correspondence control system having, a load member, a motor, and driving means between said motor and said member, the combination therewith comprising, velocity responsive means coupled to said member, velocity responsive means coupled to said motor, said velocity responsive means being connected to act in opposition when moving in corresponding directions, an integrating circuit responsive to the algebraic output of said velocity responsive means, a control member, means connected between said control member and said load member and responsive to the relative displacement therebetween, and means connected to said governing means for serially combining the output of said integrating circuit with said relative displacement means.

9. The apparatus defined in claim 8 wherein said integrating circuit further comprises, a network comprising a resistor and a capacitor whose time constant is large enough to provide substantially pure integration at frequencies at which said system would otherwise tend to oscillate.

10. In a positional correspondence control system having, a load member, a motor, and driving means between said motor and said member, the combination therewith comprising, a D.-C. generator coupled to said member a D.-C. generator coupled to said motor, an integrating circuit connected to at least one of said generators selsyn means connected to said load member to provide a measure of the displacement of said load member with respect to a desired position, an amplifier connected to said motor to govern its operation and a network connected to the input of said amplifier for combining the output of said integrating circuit and said selsyn means, said network including adjustment means for varying the relative proportions of the inputs thereto.

JOSEPH H. LIVERSIDGE.

REFERENCES CITED

The following references are of record in the file of this patent:

UNITED STATES PATENTS

| Number | Name | Date |
| --- | --- | --- |
| 2,506,798 | Lilja | May 9, 1950 |
| 2,537,083 | Peoples | Jan. 9, 1951 |

FOREIGN PATENTS

| Number | Country | Date |
| --- | --- | --- |
| 610,029 | Great Britain | Oct. 11, 1948 |